United States Patent
Ko et al.

(10) Patent No.: US 10,715,968 B2
(45) Date of Patent: Jul. 14, 2020

(54) SCHEME FOR SETTING UP PTT GROUP CALL IN A WIRELESS COMMUNICATION NETWORK

(71) Applicant: Samsung Electronics Co., Ltd., Gyeonggi-do (KR)

(72) Inventors: Hyeon-Mok Ko, Gyeonggi-do (KR); Sung-Jin Park, Gyeonggi-do (KR); Yun-Sun Baek, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 96 days.

(21) Appl. No.: 15/752,095

(22) PCT Filed: Aug. 11, 2016

(86) PCT No.: PCT/KR2016/008826
§ 371 (c)(1),
(2) Date: Feb. 12, 2018

(87) PCT Pub. No.: WO2017/026809
PCT Pub. Date: Feb. 16, 2017

(65) Prior Publication Data
US 2018/0242119 A1  Aug. 23, 2018

Related U.S. Application Data

(60) Provisional application No. 62/203,658, filed on Aug. 11, 2015.

(51) Int. Cl.
*H04W 4/10* (2009.01)
*H04W 76/00* (2018.01)
(Continued)

(52) U.S. Cl.
CPC ........... *H04W 4/10* (2013.01); *H04L 41/0803* (2013.01); *H04W 4/08* (2013.01); *H04W 76/00* (2013.01)

(58) Field of Classification Search
CPC .............................. H04W 4/10; H04L 41/0803
(Continued)

(56) References Cited

U.S. PATENT DOCUMENTS

| 5,809,018 A * | 9/1998 | Lehmusto ............... H04M 3/56 340/6.1 |
| 2004/0131060 A1 * | 7/2004 | Newberg ................. H04L 12/18 370/390 |

(Continued)

FOREIGN PATENT DOCUMENTS

WO  WO 2015102445  7/2015

OTHER PUBLICATIONS

PCT/ISA/210 Search Report issued on PCT/KR2016/008826 (pp. 3).
PCT/ISA/237 Written Opinion issued on PCT/KR2016/008826 (pp. 6).

*Primary Examiner* — John J Lee
(74) *Attorney, Agent, or Firm* — The Farrell Law Firm, P.C.

(57) ABSTRACT

The present disclosure proposes a method for joining an on-going group call by a push-to-talk (PTT) client in a wireless communication network, the method comprising: entering a coverage of the on-going group call; transmitting a group call announcement message for setting up a group call, the group call announcement message comprising a group identification (ID) of the on-going group call; receiving parameters from another PTT client participating the on-going group call; and configuring the parameters for media transfer in the on-going group call based on the received parameter.

18 Claims, 5 Drawing Sheets

(51) Int. Cl.
*H04W 4/08* (2009.01)
*H04L 12/24* (2006.01)

(58) Field of Classification Search
USPC .......... 455/517, 518, 519, 520, 67.11, 452.1,
455/509
See application file for complete search history.

(56) References Cited

U.S. PATENT DOCUMENTS

| | | |
|---|---|---|
| 2007/0189203 A1 | 8/2007 | Sung et al. |
| 2013/0029714 A1 | 1/2013 | Koren et al. |
| 2014/0162700 A1* | 6/2014 | Zhang ............... H04W 4/10 455/456.5 |
| 2014/0269556 A1* | 9/2014 | Mechaley, Jr. ......... H04W 4/10 370/329 |
| 2015/0120832 A1 | 4/2015 | Forsberg et al. |

* cited by examiner

SCHEME FOR SETTING UP PTT GROUP CALL IN A WIRELESS COMMUNICATION NETWORK

PRIORITY

This application is a National Phase Entry of International Application No. PCT/KR2016/008826, filed on Aug. 11, 2016, and claims priority to U.S. Provisional Patent Application No. 62/203,658, filed Aug. 11, 2015, the content of each of which is incorporated herein by reference.

TECHNICAL FIELD

The present disclosure relates to schemes for setting up a push-to-talk (PTT) group call in a wireless communication network, and more specifically, to a scheme for joining an on-going group call by a PTT client in the wireless communication network.

BACKGROUND ART

3GPP (3$^{rd}$ generation partnership project) has started studying to evolve existing networks to LTE (long term evolution)-based public safety solutions, which name is public safety LTE (PS-LTE). Public safety network provides communications for public safety services such as police, fire, ambulance, war, natural disaster, and so on. In general, public safety network is mainly used for mission critical text/voice/video communications among large number of users.

Mission critical push to talk (MCPTT) service in PS-LTE is intended to support one-to-one and one-to-many voice/video communications, where each user has the ability to gain an access to the permission to talk in an arbitrated manner. That is, MCPTT is a walkie-talkie-like service and the user can gain the permission to talk by pressing the 'talk button' to start talking Push-to-talk sessions are basically half-duplex communications: while one user speaks, the others should listen. Some floor control functionalities are required for controlling the talk permission.

There are two types of MCPTT network, i.e., On-network and Off network. The first one is On-network, which means that the radios talk through the existing network just as our cellular phones do. Meanwhile, MCPTT also considers the type of Off-network, which means that the radios talk directly with no help of network infra. Off-network MCPTT in Release 13 is defined as the collection of functions and capabilities required to provide direct communication between user equipments (UEs) (i.e., MCPTT clients) using proximity-based service (ProSe) discovery and ProSe communication path using evolved universal terrestrial radio access (E-UTRA).

DISCLOSURE OF INVENTION

Technical Problem

The off-network technologies are useful when the network infra is broken or missing in the critical environments. Unlike On-network communication, there is no central co-ordinates to establish a link and/or to arbitrate the permission to talk in Off-network.

Solution to Problem

The present disclosure provides schemes for managing a group call by a PTT client in a wireless communication network.

The present disclosure also provides schemes for establishing a group call by a PTT client in a wireless communication network.

The present disclosure also provides schemes for joining an on-going group call by a PTT client in a wireless communication network which is in off-network condition.

The present disclosure proposes a method for joining an on-going group call by a push-to-talk (PTT) client in a wireless communication network, the method comprising: entering a coverage of the on-going group call; transmitting a group call announcement message for setting up a group call, the group call announcement message comprising a group identification (ID) of the on-going group call; receiving parameters from another PTT client participating the on-going group call; and configuring the parameters for media transfer in the on-going group call based on the received parameter.

The present disclosure proposes a user equipment (UE) joining an on-going group call by performing a push-to-talk (PTT) in a wireless communication network, the UE comprising: a controller configured to transmit a group call announcement message for setting up a group call if the UE enters a coverage of the on-going group call, the group call announcement message comprising a group identification (ID) of the on-going group call, receive parameters from another PTT client participating the on-going group call, and configure the parameters for media transfer in the on-going group call based on the received parameter; and a transceiver configured to transmit the group call announcement message and receive the parameters under control of the controller.

Advantageous Effects of Invention

A PTT client in a wireless communication network can establish a group-call or join an on-going group call without waiting for excessive time duration.

MODE FOR THE INVENTION

Off-Network MCPTT

To operate on off-network MCPTT service, the MCPTT client should be able to switch to a ProSe direct communication path for use of MCPTT when detecting an off-network condition, such as out of network coverage. In addition, the UE can manually change the operation type of MCPTT service to off-network while in network coverage. Off-network MCPTT service has the strength that the UEs can communicate each other without any network infra, while the functionalities are very limited due to the absence of the coordinator/controller.

Off-Network Group ID Management

In an off-network, an application layer group ID is used for identifying the MCPTT group. For the communication between UEs, group ID management and discovery are done with the help of a ProSe function.

An application layer group ID should be resolved to a multicast IP address of layer 3 and a group ID of layer 2 for the group communication. An MCPTT client is able to make communication with both layer 2 group ID and layer 3 multicast IP address over ProSe direct communications. However, there is no way to resolve the multicast IP from the application layer group ID since no dedicated server exists. Instead, it is more realistic assumption that the layer 3 multicast IP and the layer 2 group ID are pre-defined in accordance with the application layer group ID, and they are tightly coupled in advance. This mapping information can be stored at a UE by either a ProSe function or a service provider.

Figure 1:
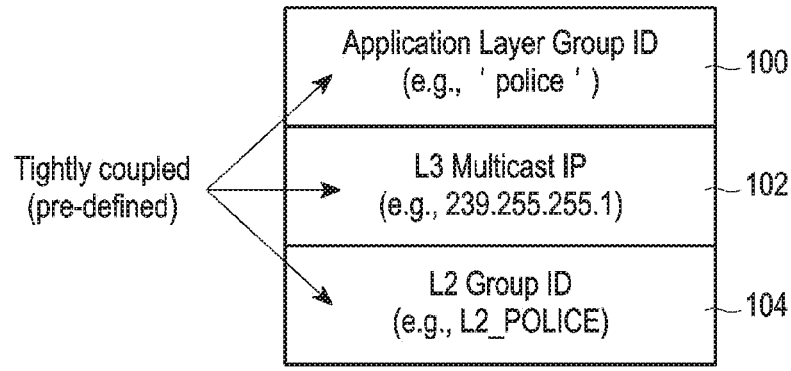
FIG. 1 illustrates an example how an application layer group ID, multicast IP of the layer 3, and group ID of the layer 2 are mapped each other.

FIG. 1 illustrates an example how an application layer group ID, multicast IP of the layer 3, and group ID of the layer 2 are mapped each other. For example, an application layer group ID 'police' 100 is resolved to a layer 3 multicast IP address '239.255.255.1' 102 and a layer 2 group ID 'L2_POLICE' 104.

Off-Network Call Setup

For push-to-talk (PTT) services, a UE(s) should set the multimedia parameters, such as audio/video codecs, multimedia port, encryption key, and so on, before they join the group communications. These multimedia parameters should be shared among the UEs of the group to talk each other. This is the reason why a call setup procedure should be done before group communication. The group call procedure is also used for the MCPTT clients lately to join the group.

Basically, the MCPTT client just waits the Group Call Announcement message from other UE(s). The Group Call Announcement message contains at least one of following parameters such as group identity, group call originator identity, media type, media codec, bandwidth, multicast port number for media, port number for floor control protocol, or any encryption key for the media encryption if needed. Optionally, the message may contain confirm mode indication. These media parameters are used in the MCPTT group call. When receiving the announcement message, the MCPTT client configures its own parameters and joins the announced MCPTT group call.

When the MCPTT clients waiting for Group Call Announcement message cannot receive any Group Call Announcement message for a certain time, one of the MCPTT clients can become a group call originator which firstly sends Group Call Announcement message to the group. After group call establishment, all group call participants periodically send the Group Call Announcement message for MCPTT client to join the group call late. The period of Group Call Announcement is decided depending on the number of the group call participants. As a result, a newly-joining MCPTT client can listen to at least one of Group Call Announcement messages within a certain time regardless of radio coverage.

Figure 2:
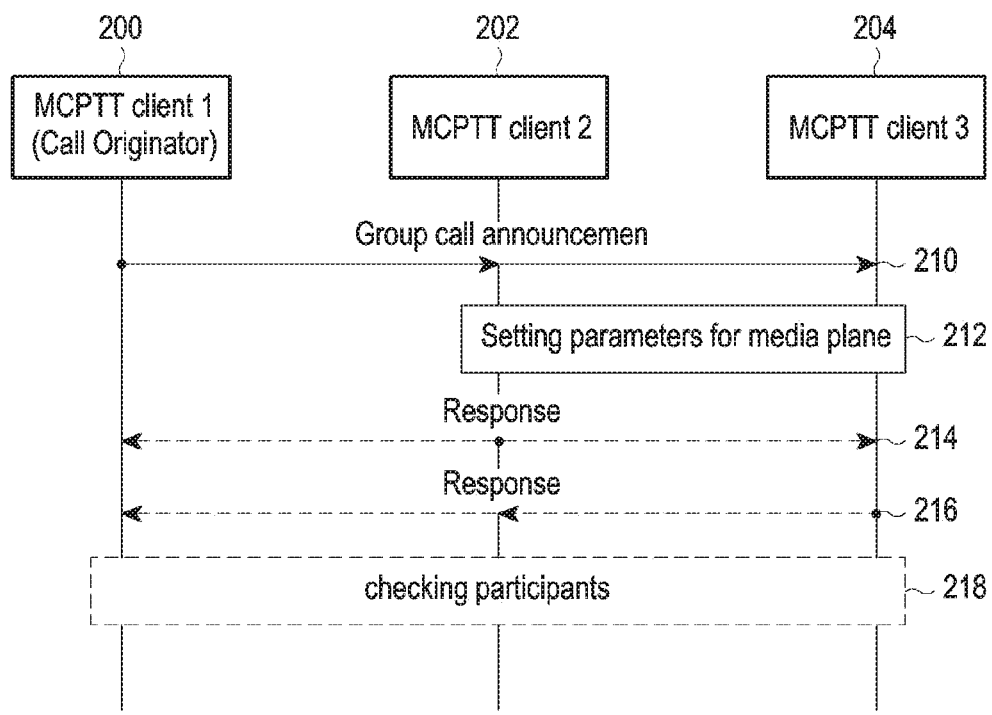
FIG. 2 illustrates an example of off-network group call setup.

FIG. 2 illustrates an example of off-network group call setup.

As shown in FIG. 2, a control plane procedure for a MCPTT group call establishment (or setup) for off-Network may be performed. The procedure describes how a MCPTT client initiates an MCPTT group call with other MCPTT client within off-network radio coverage and how the group call is established. It is assumed that a group multicast IP address and a receiving signaling port are pre-configured for the call setup signaling. All messages are sent through the pre-configured multicast path.

MCPTT client 1 200 as a group call originator firstly sends Group Call Announcement message to the group (210). A MCPTT client 2 202 and a MCPTT client 3 204 configures the parameters for media delivery by making use of the received parameters in Group Call Announcement (212). The MCPTT client 2 202 and MCPTT client 3 204 may send the Response message to the group (214, 216) when the Group Call Announcement from originator includes confirm mode indication. The Response message contains MCPTT user identity. The MCPTT client 2 202 and 3 204 recognize the group call originator through the Group Call Announcement and the MCPTT Client 1 200 checks the participants of the group call (218) through the received Response message 214 or 216. Due to the movement of the participants (in and out of the radio coverage) during the off-network group call, the Group Call Announcement including parameters for media delivery may be periodically sent. The participating MCPTT Clients 200, 202, 204 do not need to respond to the periodic group call announcement including the parameters for media delivery.

Figure 3:
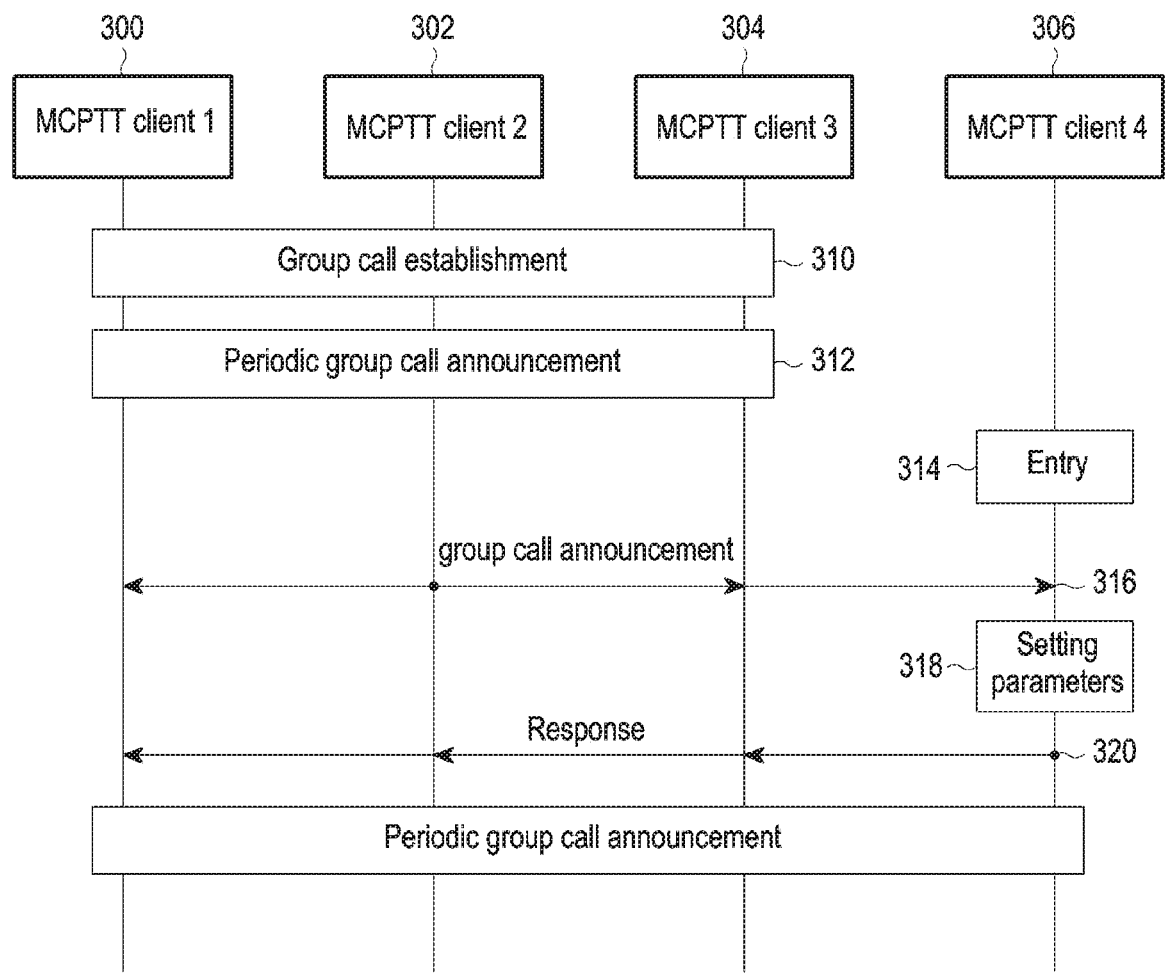
FIG. 3 illustrates an example of periodic group call announcement.

FIG. 3 illustrates an example of periodic group call announcement.

As shown in FIG. 3, after a MCPTT group call establishment (310), a Group Call Announcement including the parameters for a media transfer has been performed periodically (312), in order for a MCPTT client to join later the established MCPTT group call. In the FIG. 3, a MCPTT client 4 306 may enter a coverage of the MCPTT group call lately (314). A MCPTT client 2 302 sends the Group Call Announcement message (316). The MCPTT client 4 306 configures the parameters for media transfer (318) by using the received parameters in the group call announcement 316. The MCPTT client 4 306 may send a Response message to the group (320) when the periodic Group Call Announcement 312 includes confirm mode indication. The Response message 320 may contain a MCPTT user identity. MCPTT Client 1 300, MCPTT Client 2 302, and MCPTT Client 3 304 check through the received Response message 320 that the MCPTT client 4 306 joins the group call.

Due to an interval between the group call announcements, the late-joining MCPTT client (i.e., the MCPTT client 4 306) should wait the Group Call Announcement message for a while. A session announcement protocol (SAP), one of famous protocol for session announcement mechanism, defines 300 seconds as a maximum interval between announcements in request for comment (RFC) 2974. That is, the late-joining MCPTT client should wait around 300 seconds in the worst case. To solve the issue, an active joining approach is additionally required for the fast group call joining.

Active Join to Group Call

Figure 4:
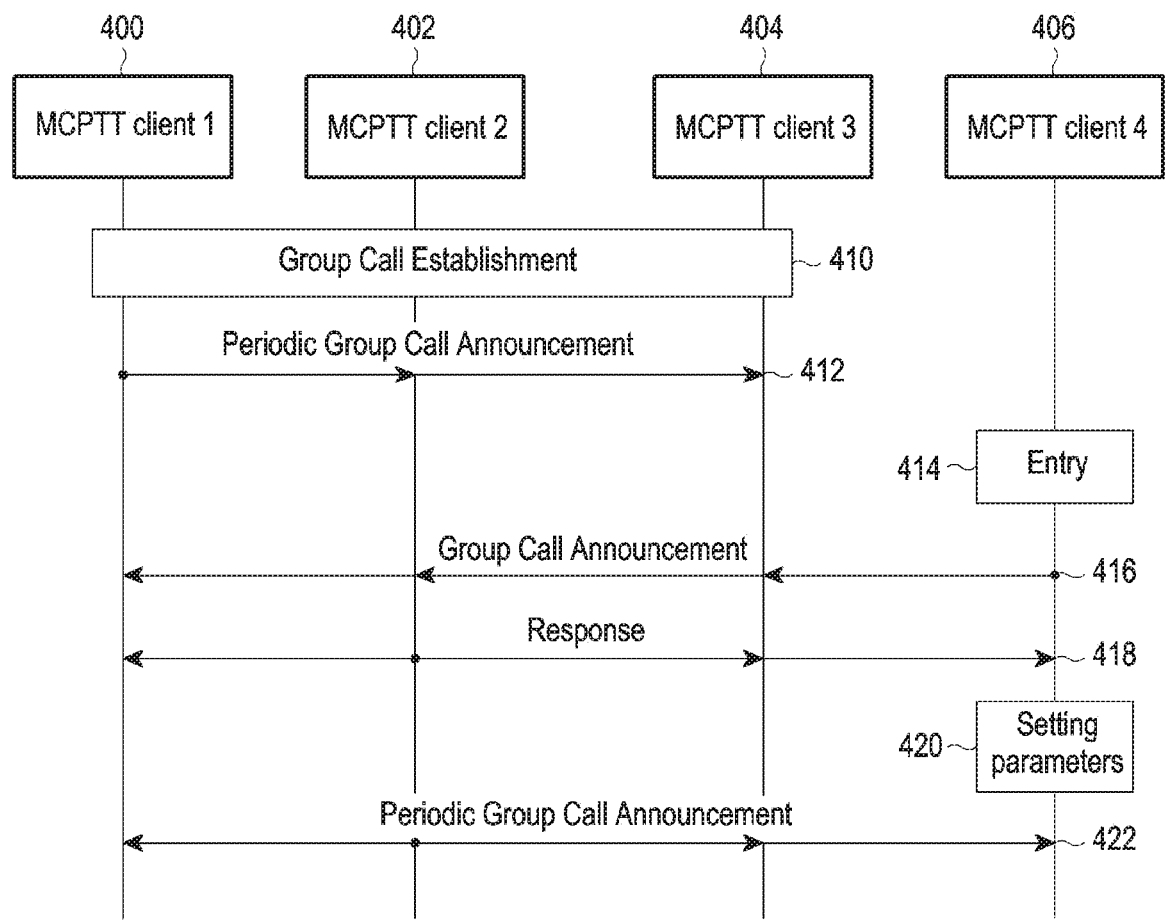
FIG. 4 illustrates a procedure for a MCPTT client to join an on-going MCPTT group call.

FIG. 4 illustrates a procedure for a MCPTT client to join an on-going MCPTT group call.

As shown in FIG. 4, after a MCPTT group call establishment (410), a Group Call Announcement including parameters for a media transfer has been performed periodically (412), in order for a MCPTT client to join later the established MCPTT group call. A MCPTT client 4 406 may enter a coverage of the MCPTT group call lately (414). The MCPTT client 4 406 with an active join protocol initiates by sending a Group Call Announcement message with its own parameter(s) to setup an MCPTT group call having a group ID of the on-going MCPTT group call without waiting for receiving any periodic announcement, even though the MCPTT group call with the same group ID is already established.

MCPTT clients 400, 402, 404 in the group call receive the Group Call Announcement message from the MCPTT client 4 and check whether or not the group call with the group ID in the received Group Call Announcement message is established. In case the group call with the group ID is on-going, one of MCPTT clients (e.g., the MCPTT client 2 402) who receive the Group Call Announcement message 416 from the MCPTT client 4 406 may send a Response message to the group (418).

The MCPTT client(s) may perform a backoff mechanism to avoid sending the same Response messages in response to the multicast based Group Call Announcement message 416. In the backoff mechanism, the MCPTT client(s) randomly choose a backoff value in a range [0, maxBackoff] for sending the Response message, and the MCPTT client should defer its transmissions for the duration corresponding to the chosen backoff value. That is, one of the MCPTT clients choosing the smallest number firstly sends the Response message. If one of the MCPTT clients receives the same Response message to be sent from another MCPTT client, then the one may not send the same Response message.

Since the Response message 418 contains current multimedia parameters for media transfer, the MCPTT client 4 406 recognizes that the on-going MCPTT group call with the same group ID already exists and configures the multimedia parameters for media transfer (e.g., receive or transmit a voice) by using the multimedia parameters in the received Response message (420). Finally, the MCPTT client 4 406 joins the on-going MCPTT group call.

Figure 5:
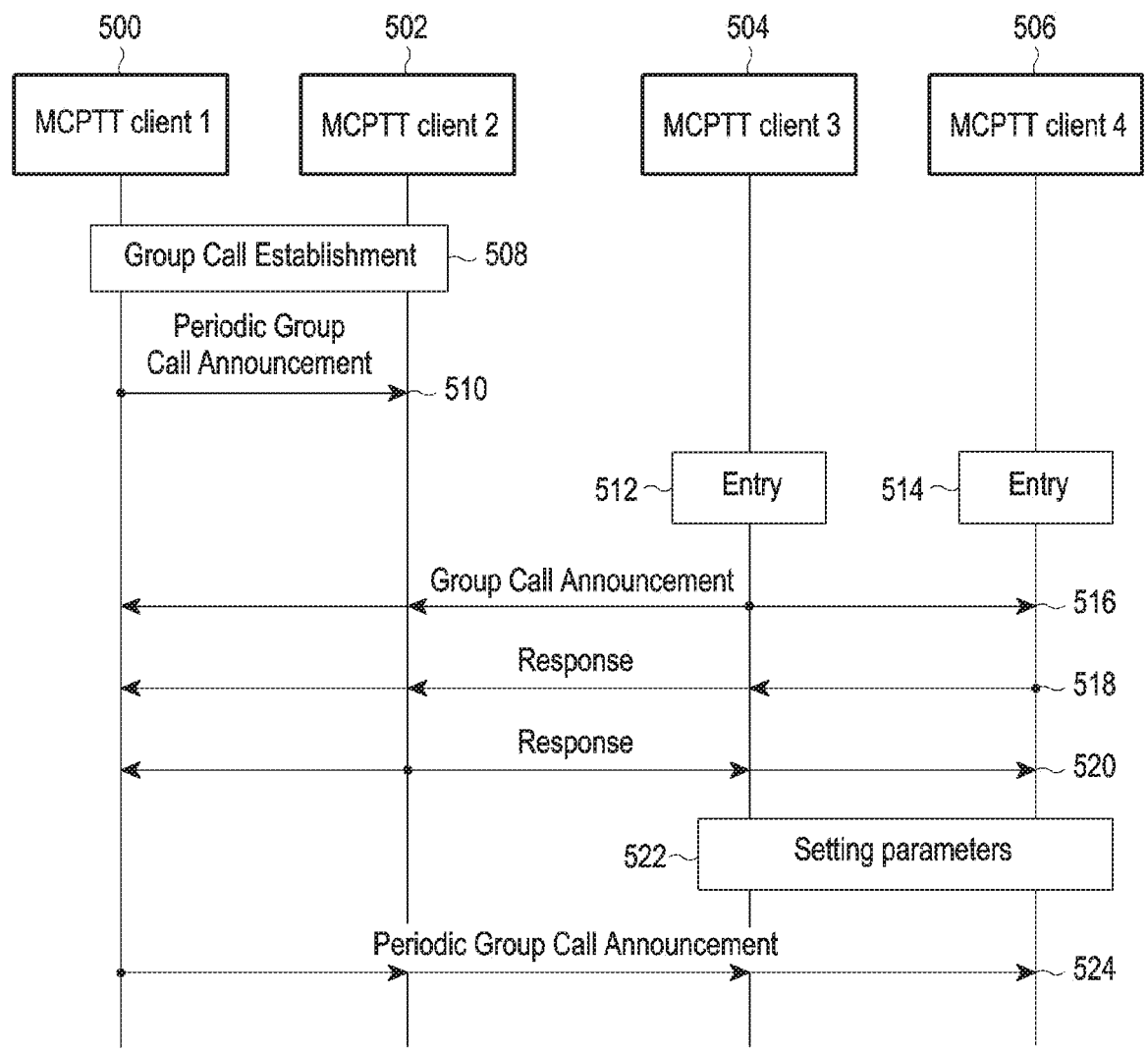
FIG. 5 illustrates a procedure for multiple MCPTT clients to join an on-going MCPTT group call.

FIG. 5 illustrates a procedure for multiple MCPTT clients to join an on-going MCPTT group call.

As shown in FIG. 5, after a MCPTT group call establishment (508), a Group Call Announcement including parameters for a media transfer has been performed periodically (510), in order for a MCPTT client to join later the established MCPTT group call. A MCPTT client 3 504 or MCPTT client 4 506 may enter a coverage of the MCPTT group call lately (512, 514). The MCPTT client 3 504 with an active join protocol initiates by sending a Group Call Announcement message 516 with its own parameter(s) to setup an MCPTT group call having a group ID of the on-going MCPTT group call without waiting for receiving any periodic announcement, even though the MCPTT group call with the same group ID is already established.

MCPTT clients 500, 502, 506 in the group call receive the Group Call Announcement message from the MCPTT client 3 504 and check whether or not the group call with the group ID in the received Group Call Announcement message is established. In case the group call with the group ID is on-going, one of MCPTT clients (e.g., the MCPTT client 2 502) who receive the Group Call Announcement message 516 from the MCPTT client 4 406 may send a Response message to the group (520).

The MCPTT client(s) may perform a backoff mechanism to avoid sending the same Response messages in response to the multicast based Group Call Announcement message 516.

Since the Response message 520 contains current multimedia parameters for media transfer, the MCPTT client 3 504 recognizes that the on-going MCPTT group call with the same group ID already exists and configures the multimedia parameters for media transfer (e.g., receive or transmit a voice) by using the multimedia parameters in the received Response message 520. Finally, the MCPTT client 3 504 joins the on-going MCPTT group call.

An off-network MCPTT service requires the ProSe discovery and communication path. A ProSe system provides the communication path as multicast based message transmissions. Thus, all communications including signaling and multimedia transmissions between UEs in the off-network MCPTT service may be performed in a multicast manner.

The stage 2 technical specification (TS) provided by SA6 (: 3GPP TSG SA WG6 which is responsible for mission-critical applications) talks about a call setup for off-network MCPTT. SA6 agreed that the MCPTT group call setup in an off-network is based on a group call announcement since there is no centralized MCPTT server to take the responsibility of participant invitation and session negotiations just as in on-network environments. Note that the off-network MCPTT group call announcement shall include media parameters for media delivery even though media parameters are not required. A well-known protocol to be used for session negotiation is a session initiation protocol (SIP) specified in RFC 3261. However, this protocol is not adequate for the off-network MCPTT service as the negotiation procedure may yield unpredictable delay and may not work well under sever-less environments. Note that the objective with the call setup for the off-network MCPTT service is to establish a call between UEs as quickly as possible.

In order to assist advertisements of multicast multimedia conferences and other multicast sessions, and to communicate relevant session setup information to prospective participants, a distributed session directory may be used. An instance of such a session directory periodically multicasts packets containing a description of the session, and these advertisements are received by other session directories such that potential remote participants can use the session description (i.e., the description of the session) to start tools required to participate in the session. RFC 2974 describes issues involved in the multicast announcement of session description information and defines an announcement protocol to be used. Sessions are described using the session description protocol which is described in a companion memo RFC 4566.

The followings shows the comparison between session initiation protocol (SIP) and session announcement protocol (SAP) specified in RFC 2974, which are candidates for session establishment in off-network environment.

TABLE 1

| Aspects | SIP | SAP | Note |
|---|---|---|---|
| Multicast-based communication | Unicast-based 1:1 communication | Multicast-based 1:N communication (Applicable to de-centralized communication) | |

TABLE 1-continued

| Aspects | SIP | SAP | Note |
| --- | --- | --- | --- |
| Sessup setup manner | Invitation-based (Response for the invitation and the centralized sever is required) | Periodic announcement-based (no response required) | SIP provides media parameters negotiation, but is not applicable unless centralized server is provisioned |
| Media parameter Delivery | SDP | SDP | |
| Required Enhancement for off-network MCPTT | Multicast-based session initiation mechanism | Optimization of period of announcement transmission If required, media parameter negotiation procedures | |

Based on the comparison in Table 1, SAP is more appropriate protocol for off-network solution than SIP. SIP may be candidate for the off-network group call setup, however, multicast transmission based mechanism needs to be newly invented in current SIP specification, which requires quite long time.

Call Setup for Off-Network MCPTT

Session Announcement

A MCPTT client may periodically send an announcement packet to a well known multicast address and port. There is no rendezvous mechanism—a MCPTT session announcer may be not aware of the presence or absence of any MCPTT listeners—and no additional reliability is provided over the standard best-effort user data protocol/internet protocol (UDP/IP) semantics.

That announcement contains a session description and may contain an authentication header. The session description may be encrypted although this is not recommended.

A SAP announcement is multicast with the same scope as the session the SAP announcement is announcing, ensuring that the recipients of the announcement are within the scope of the session the announcement describes. There are a number of possibilities.

SAP announcements may be sent on port 9875 and may be sent with an IP time-to-live of 255.

If a session uses addresses in multiple administrative scope ranges, it is necessary for the announcer to send identical copies of the announcement to each administrative scope range. It is up to listeners to parse such multiple announcements as the same session (as identified by a session description protocol (SDP) origin field, for example). An announcement rate for each administrative scope range may be calculated separately, as if the multiple announcements were separate.

Multiple announcers may announce a single session, as an aid to robustness in the face of packet loss and failure of one or more announcers. The rate at which each announcer repeats its announcement may be scaled back such that a total announcement rate is equal to that which a single server would choose. Announcements made in this manner may be identical. If multiple announcements are being made for a session, then each announcement may carry an authentication header signed by the same key, or be treated as a completely separate announcement by listeners.

An IPv4 MCPTT listener may listen on a IPv4 global scope multicast address and on a multicast addresses for each IPv4 administrative scope zone within which the listener is. The discovery of administrative scope zones is outside the scope of the present disclosure, but it is assumed that each MCPTT listener within a particular scope zone is aware of the particular scope zone. A MCPTT listener which supports IPv6 may also listen to a IPv6 SAP addresses.

Session Deletion (Session Release)

Explicit Deletion

A session deletion packet is received for specifying a session to be deleted (or released). Session deletion packets may have a valid authentication header, matching that used to authenticate previous announcement packets. If this authentication is missing in the session deletion packet, the deletion packet may be ignored.

Time-Out Based Deletion

Explicit Timeout

A session description payload may contain timestamp information for specifying the start-time and end-time of a session. If current time is later than the end-time of the session indicated by the time stamp information, then the session may be deleted from a receiver's session cache or the group ID of the group call may be deleted from the receiver's session cache.

Implicit Timeout

A session announcement message may be received periodically for each session description in a receiver's session cache. An announcement period can be predicted by the receiver from a set of sessions currently being announced. For example, if a session announcement message has not been received for a predetermined period (e.g., ten times the announcement period, or one hour, whichever is the greater) then the session is deleted from the receiver's session cache. The one hour minimum is to allow for transient network partitioning.

Session Modification

A pre-announced session can be modified by simply announcing a modified session description. In this case, a version hash in a SAP header may be changed to indicate to receivers that packet content should be parsed (or decrypted and parsed if the packet content is encrypted). The session itself, as distinct from the session announcement, is uniquely identified by the payload and not by a message identifier hash ('msg id hash') in the SAP header.

The same rules may apply for session modification as for session deletion. For example, a session modification announcement may contain an authentication header signed by the same key as a cached session announcement which the session modification announcement is modifying. The cached session announcement may not contain an authentication header, and the session modification announcement may originate from the same host as the session which the session modification announcement is modifying.

If an announcement containing an authentication header is received and the cached session announcement did not contain an authentication header, or the cached session announcement contained a different authentication header, then the session modification announcement may be treated as a new and different announcement, and displayed in addition to an un-authenticated announcement. The same should happen if a modified packet without an authentication header is received from a different source than a source of the original announcement.

These rules prevent an announcement having an authentication header added by a malicious user and then being deleted using that header, and it also prevents a denial-of-service (DOS) attack by someone putting out a spoof announcement which, due to packet loss, reaches some participants before the original announcement. Note that under such circumstances, being able to authenticate the message originator is the only way to discover which session is the correct session Session Announcement Message The MCPTT client may generate a session announcement message for a group call. The definition of the fields in the session announcement protocol (SAP) packet is found in internet engineering task force (IETF) RFC 2974. Table 1 shows the SAP packet format.

Figure 7:
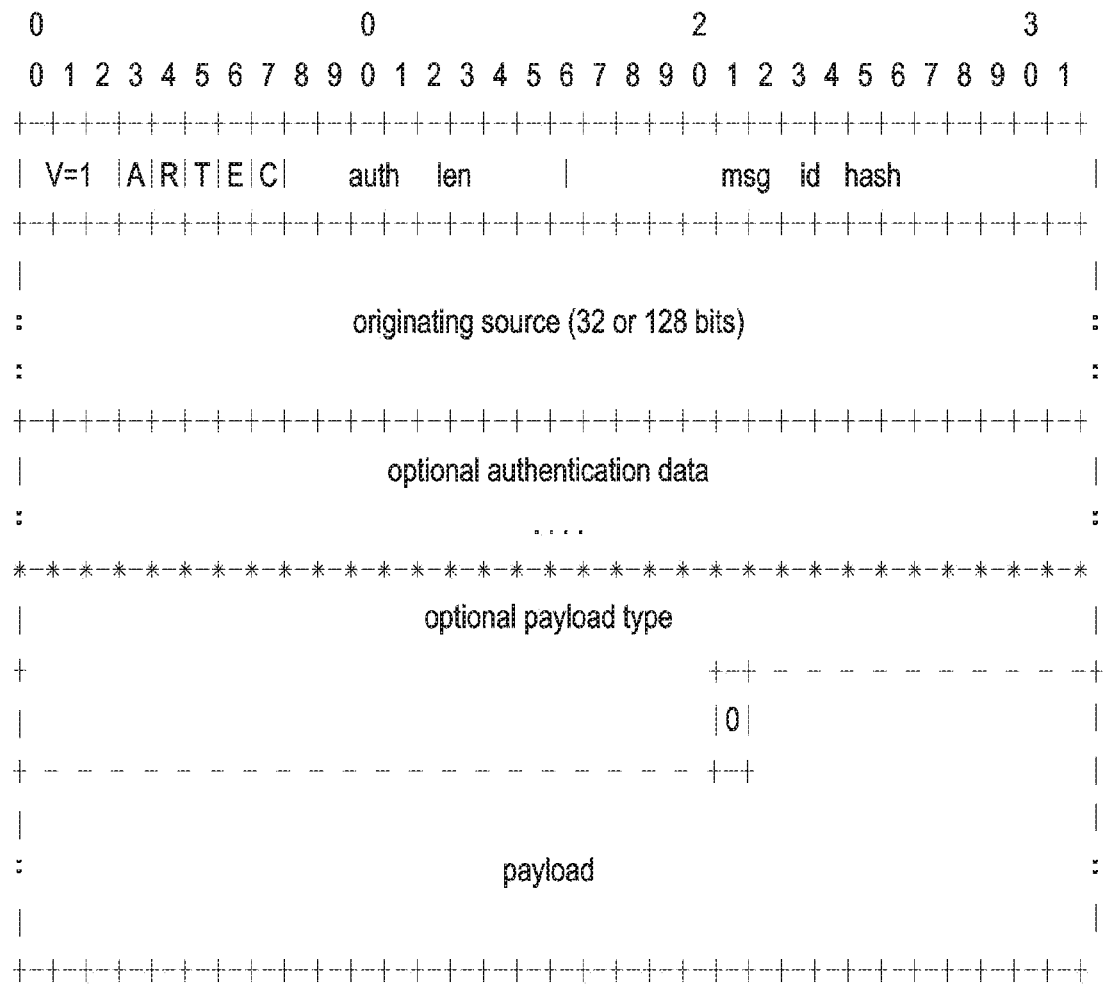
FIG. 7 illustrates a format of an SAP message (or SAP packet).

FIG. 7 illustrates a format of an SAP message (or SAP packet).

Referring to the FIG. 7, an MCPTT client may generate a SAP message header in accordance with the rules for fields and procedures as follows.

1) 'V': Version Number (3 bit): The version number field may be set to 1 for off-network MCPTT service specified in Rel-13.

2) 'A': Address type (1 bit): If the A bit is 0, the originating source field contains a 32-bit IPv4 address. If the A bit is 1, the originating source contains a 128-bit IPv6 address.

3) 'R': Reserved (1 bit): MCPTT client listeners may ignore the content of this field.

4) 'T': Message Type (1 bit): If the T field is set to 0, this is a session announcement packet, if the T field is set to 1, this is a session deletion packet.

5) 'E': Encryption Bit (1 bit): If the encryption bit is set to 1, the payload of the SAP packet is encrypted. If the encryption bit is 0, the payload of the SAP packet is not encrypted.

6) 'C': Compressed bit (1 bit): If the compressed bit is set to 1, the payload of the SAP packet is compressed.

7) 'auth len': Authentication Length (8 bit): An 8 bit unsigned quantity giving the number of 32 bit words following the main SAP header that contain (optional) authentication data. If the auth len field is zero, no authentication header is present.

8) 'msg id hash': Message Identifier Hash (16 bit): A 16 bit quantity that, used in combination with an originating source field, provides a locally unique identifier indicating a precise version of this announcement (i.e., the SAP message). A choice of value for this field is not specified here, except that it is unique for each session announced by a particular SAP announcer and it is changed if the session description is modified (and a session deletion message may be sent for an old version of the session). Earlier versions of SAP may use a value of zero to mean that the hash should be ignored and the payload should always be parsed. This had the unfortunate side-effect that SAP announcers had to study the payload data to determine how many unique sessions were being advertised, making the calculation of the announcement interval more complex than necessary. In order to decouple the session announcement process from the content of those announcements, SAP announcers may not set the message identifier hash to zero. SAP listeners may silently discard messages if the message identifier hash is set to zero.

9) 'Originating Source' (32 or 128 bit): This field gives the IP address of the original source of the message. This is an IPv4 address if the A field is set to zero, else it is an IPv6 address. The address is stored in network byte order.

10) 'Optional authentication data': Authentication data containing a digital signature of the packet, with length as specified by the auth len field.

Optional Payload Type

11) 'optional payload type' field is a multipurpose internet mail extensions (MIME) content type specifier, describing a format of the payload (i.e., payload format). This is a variable length American standard code for information interchange (ASCII) text string, followed by a single zero byte (ASCII NUL). The payload type may be included in all packets. All implementations may support payloads of type 'application/sdp' specified in [RFC 4566]. SDP offer shall be generated in according to the rules and procedures as specified in subclause 11.5 "Session description offer generation". Other formats may be supported.

Payload

12) The header is followed by the optional payload type field and 'payload' data itself. If the 'E' or 'C' field is set in the header, both the payload type and the payload are encrypted or compressed, respectively.

If the packet is an announcement packet, the payload contains a session description.

If the packet is a session deletion packet, the payload contains a session deletion message.

If the payload format indicated by the optional payload type field is 'application/sdp', the deletion message is a single SDP line consisting of an origin field of the announcement to be deleted.

It is desirable for the payload to be sufficiently small that SAP packets do not get fragmented by an underlying network. Fragmentation has a loss multiplier effect, which is known to significantly affect the reliability of announcements. It is recommended that SAP packets are smaller than 1 kByte in length, although if it is known that announcements will use a network with a smaller maximum transmission unit (MTU) than this, then the smaller MTU may be used as the maximum recommended packet size.

Session Description Offer Generation

For an off-network MCPTT session, one or more media types may be offered. The offered media streams may be of MCPTT speech, audio, video, and discrete media streams. Media streams for an off-network MCPTT Session are offered with an SDP body, each independent media stream of offered media type represented by its own media-level section also known as m-line. One off-network MCPTT Session may include one or more media-floor control entities. A MCPTT client may generate a SDP offer for a group call in accordance with rules and procedure of [RFC 4566].

The off-network MCPTT client may generate a SDP offer when the MCPTT client initiates the off-network MCPTT session as specified later in "MCPTT Client initiates a pre-arranged Session". The SDP body generated as a SDP offer is used for setting up the session by the MCPTT client.

The off-network MCPTT client may generate a SDP offer after the MCPTT client have joined a off-network MCPTT session as specified later in "MCPTT Client joins a pre-arranged Session".

The off-network MCPTT client may include at least one of session-level section consisting of: a) the "o=<username>" field set to a MCPTT client ID; b) the "s=<session name>" field set to a MCPTT group ID; and c) the "c=<connection-address>" field set to a multicast IP address of the MCPTT group.

The off-network MCPTT client may include at least one of media-level section for each offered Media Stream consisting of: a) the "m=<media>" field set to a type of offered MCPTT media stream (MCPTT speech media exists at most once in the SDP offer); b) the "m=<port>" field set to a port number for the media stream selected; c) the "a=" field set to the codec(s) and media parameters; and d) the port number to be used for real time control protocol (RTCP) at the MCPTT client selected according to rules and procedures of [RFC3605], if the media stream uses the RTCP protocol and other than a default IP address or port number specified by the [RFC3550] is to be used.

The off-network MCPTT client may offer the currently used media streams with used media-level section parameters when the MCPTT client generates the SDP offer periodically.

The off-network MCPTT client may offer an additional media type when the MCPTT client offers to add new media type to the current MCPTT Session (The MCPTT client is not necessarily authorized to add a media type to the existing MCPTT session).

The off-network MCPTT client may offer to add a new MediaType, to connect to a media type and to disconnect from a media stream in the MCPTT session in the same group call.

MCPTT Client Initiates a Pre-Arranged Session

When a MCPTT client initiates a pre-arranged session, the MCPTT client may generate a session announcement message as specified above in "Session Announcement Message". The MCPTT client may include a SDP body as a SDP offer as specified above in "Session description offer generation". The MCPTT client may send the session announcement message towards MCPTT clients according to rules and procedures as specified above in "Session Announcement".

Upon receiving a response message to the session announcement message, the MCPTT client may cache the presence of the MCPTT client in a contact list. And the MCPTT client may establish a MCPTT session based on the media-level section parameters from the SDP body.

MCPTT Client Joins a Pre-Arranged Session

Upon receiving a session announcement message (i.e., a group call announcement message) from a first MCPTT client to establish a pre-arranged, a second MCPTT client may cache a presence of the first MCPTT client in a contact list. For example, the second MCPTT client may store at least one of a group ID, a SDP information element (IE), or a user ID of the session announcement message. And the second MCPTT client may set a session name of a SDP MIME to a group ID that identifies the pre-established session. The second MCPTT client may display information to a user of the second MCPTT client based on the information in the SDP MIME. The second MCPTT client may generate an session announcement message as specified abole in "Session Announcement Message". The second MCPTT client may include a SDP body as a SDP offer as specified above in "Session description offer generation".

The second MCPTT client may send the session announcement message towards MCPTT clients according to rules and procedures as specified above in "Session Announcement".

Figure 6:
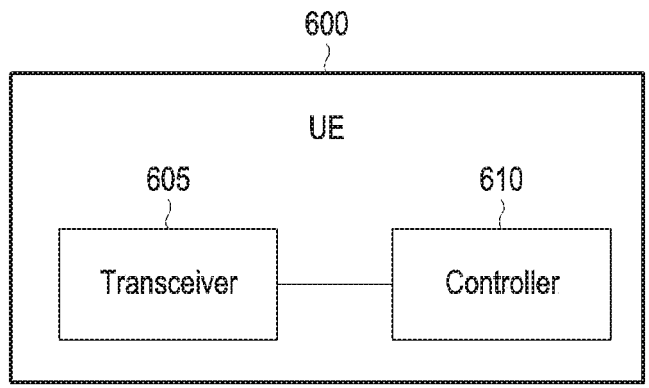
FIG. 6 is a view schematically illustrating a configuration of a UE according to an embodiment of the present disclosure.

FIG. 6 is a view schematically illustrating a configuration of a UE according to an embodiment of the present disclosure.

A UE 600 illustrated in FIG. 6 can be any MCPTT client described above in the present disclosure.

The UE 60 may include a transceiver 605 communicating signals with other UE, client or an entity in a wireless communication network and a controller 610 controlling all of the operations performed by the UE 900. It may be appreciated that all of the operations of the MCPTT client described above in the present disclosure are performed under the control of the controller 610. However, the controller 610 and the transceiver 605 are not necessarily implemented as separate devices, respectively, but may be implemented in a single configuration unit in the form of, e.g., a single chip.

It should be noted that the system configuration, exemplary methods, signal flow between MCPTT clients, communication flow between the MCPTT clients, and the structure of the UE illustrated in FIGS. 1 to 6 as examples are not intended to limit the scope of the present disclosure. That is, the messages, signals, operations, or steps in the constituent units described in connection with FIGS. 1 to 6 should not be interpreted as essential components to practice the present disclosure, and only some of the messages, signals, operations, or components may be included, or changes in order may be made to the operations without affecting the essence of the present disclosure.

The above-described operations may be realized by equipping a memory device retaining their corresponding codes in a UE or a MCPTT client in a communication system. That is, the controller in the UE may execute the above-described operations by reading and executing the program codes stored in the memory device by a processor or central processing unit (CPU).

As described herein, various constituent units or modules in the UE or MCPTT client may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for joining an on-going group call by a push-to-talk (PTT) client in a wireless communication network, the method comprising:
   identifying whether the PTT client enters a coverage of the on-going group call;
   transmitting, by the PTT client, a message for requesting information to be used to participate in the on-going group call to one or more PTT clients participating in the on-going group call, in response to the PTT client entering the coverage, the message including a group identification (ID) of the on-going group call;

receiving a response message from at least one PTT client among the one or more PTT clients, the at least one PTT client being determined based on a minimum value among the one or more values; and configuring parameters for multimedia data transfer in the on-going group call based on the response message, wherein each of the one or more values is randomly selected for each of the one or more PTT clients.

2. The method of claim 1, further comprising:
transmitting the message including the group identification of the on-going group call if another message is not received for a first period.

3. The method of claim 1, further comprising:
generating the message based on a session announcement protocol (SAP) packet format.

4. The method of claim 1, further comprising:
generating a session description protocol (SDP) body as a SDP offer; and
setting up the on-going group call based on the generated SDP body.

5. The method of claim 1, further comprising:
caching a presence of a new PTT client in a contact list if a new message for requesting information to be used to participate in an on-going group call is received from the new PTT client.

6. The method of claim 1, wherein the wireless communication network is in an off-network condition.

7. The method of claim 1, wherein the PTT client is a mission critical PTT (MCPTT) client.

8. The method of claim 1, wherein the message includes a message identifier hash field including a value of non-zero.

9. The method of claim 1, wherein the multimedia data includes at least one of a mission critical PTT (MCPTT) speech data, audio data, video data, and data for discrete media streams.

10. A user equipment (UE) joining an on-going group call by performing a push-to-talk (PTT) in a wireless communication network, the UE comprising:
a transceiver; and
a processor configured to:
identify whether the UE enters a coverage of the on-going group call,
control the transceiver to transmit, by the UE, a message for requesting information to be used to participate in a group call to one or more UEs participating in the on-going group call, if the UE enters the coverage, the message including a group identification (ID) of the on-going group call,
control the transceiver to receive a response message from at least one UE among the one or more UEs, the at least one UE being determined based on a minimum value among one or more values, and
configure parameters for multimedia data transfer in the on-going group call based on the response message,
wherein each of the one or more values is randomly selected for each of the one or more UEs.

11. The UE of claim 10, wherein the processor is further configured to transmit the message including the group identification of the on-going group call if another message is not received for a first period.

12. The UE of claim 10, wherein the processor is further configured to generate the message based on a session announcement protocol (SAP) packet format.

13. The UE of claim 10, wherein the processor is further configured to generate a session description protocol (SDP) body as a SDP offer and set up the on-going group call based on the generated SDP body.

14. The UE of claim 10, wherein the processor is further configured to cache a presence of a new PTT client in a contact list if a new message for requesting information to be used to participate in an on-going group call is received from the new PTT client.

15. The UE of claim 10, wherein the wireless communication network is in an off-network condition.

16. The UE of claim 10, wherein the UE is a mission critical PTT (MCPTT) client.

17. The UE of claim 10, wherein the message includes a message identifier hash field including a value of non-zero.

18. The UE of claim 10, wherein the multimedia data includes at least one of a mission critical PTT (MCPTT) speech data, audio data, video data, and data for discrete media streams.

* * * * *